United States Patent
Lo et al.

(10) Patent No.: US 12,533,851 B2
(45) Date of Patent: Jan. 27, 2026

(54) 3D PRINTING APPARATUS

(71) Applicant: Young Optics Inc., Hsinchu (TW)

(72) Inventors: Wei-Cheng Lo, Hsinchu (TW); You Ren Wang, Hsinchu (TW); Chang Chun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 101 days.

(21) Appl. No.: 17/864,418

(22) Filed: Jul. 14, 2022

(65) Prior Publication Data

US 2023/0079547 A1 Mar. 16, 2023

(30) Foreign Application Priority Data

Sep. 14, 2021 (TW) .................. 110134180

(51) Int. Cl.
| | | |
|---|---|---|
| *B29C 64/00* | (2017.01) | |
| *B29C 64/129* | (2017.01) | |
| *B29C 64/245* | (2017.01) | |
| *B29C 64/295* | (2017.01) | |
| *B29C 64/321* | (2017.01) | |
| *B33Y 30/00* | (2015.01) | |

(52) U.S. Cl.
CPC .......... *B29C 64/321* (2017.08); *B29C 64/129* (2017.08); *B29C 64/245* (2017.08); *B29C 64/295* (2017.08); *B33Y 30/00* (2014.12)

(58) Field of Classification Search
None
See application file for complete search history.

(56) References Cited

U.S. PATENT DOCUMENTS

| | | | | |
|---|---|---|---|---|
| 5,437,820 A | * | 8/1995 | Brotz | .............. B29C 64/153 |
| | | | | 264/308 |
| 2016/0200052 A1 | * | 7/2016 | Moore | .............. B29C 64/20 |
| | | | | 264/401 |
| 2018/0015669 A1 | * | 1/2018 | Moore | ............... B29C 64/245 |
| 2019/0061246 A1 | * | 2/2019 | Feller | ............... B29C 37/006 |
| 2021/0094231 A1 | * | 4/2021 | Feller | ............... B29C 64/393 |
| 2023/0078824 A1 | * | 3/2023 | Poelma | .............. B29C 64/307 |
| | | | | 264/401 |

FOREIGN PATENT DOCUMENTS

| | | | |
|---|---|---|---|
| CN | 111016163 | | 4/2020 |
| CN | 113858609 A | * | 12/2021 |

OTHER PUBLICATIONS

Cai et al., Heat preservation 3D printer, 2021, Espacenet, machine translation. (Year: 2021).*

* cited by examiner

*Primary Examiner* — Nicholas Krasnow
(74) *Attorney, Agent, or Firm* — JCIPRNET

(57) ABSTRACT

A 3D printing apparatus including a base plate, a transparent plate, a fluid space, a molding container, a heater, a fluid guider and a light engine is provided. The fluid space is disposed between the base plate and the transparent plate. The molding container has an accommodating space and the base plate is disposed in the accommodating space. The heater is configured to heat a fluid. The fluid guider is configured to guide the heated fluid into the fluid space. The light engine is configured to project a pixelated light on the base plate.

8 Claims, 3 Drawing Sheets

3D PRINTING APPARATUS

CROSS-REFERENCE TO RELATED APPLICATION

This application claims the priority benefit of Taiwanese application no. 110134180, filed on Sep. 14, 2021. The entirety of the above-mentioned patent application is hereby incorporated by reference herein and made a part of this specification.

BACKGROUND

Technical Field

The disclosure relates to an additive manufacturing apparatus, and in particular, to a 3D (three-dimensional) printing apparatus.

Description of Related Art

Ultraviolet curing (UV curing) is a process by which ultraviolet is used to initiate a photochemical reaction. UV curing plays a key role in three-dimensional printing (3D printing). However, a UV adhesive has different viscosity as the environment temperature changes. The viscosity decreases when the temperature is high, while the viscosity increases when the temperature is low. Viscosity affects a covering speed of the UV adhesive on curing glass and a magnitude of a release pulling force.

In one of the conventional technologies, hot air is used to heat the entire system. However, it takes a long period of time to warm up and a lot of energy. In addition, it is required to equip a housing with a heat insulation design. The hot air cannot effectively heat the UV adhesive, and the overall cost is too high.

In another conventional technology, a polyester film heater is attached around the curing glass to heat the glass. However, glass exhibits a low thermal diffusivity and an uneven temperature distribution, and temperature control cannot be effectively achieved.

SUMMARY

The disclosure is directed to a 3D printing apparatus including a favorable heating system providing uniform heating and a high heating efficiency.

According to an embodiment of the disclosure, a 3D printing apparatus including a tank, a first transparent plate, a second transparent plate, a gas channel, a heater, and a fluid guider is provided. The tank is disposed to accommodate a photocurable resin. The first transparent plate is disposed at a bottom of the tank. The second transparent plate is disposed below the first transparent plate. The gas channel is disposed between the first transparent plate and the second transparent plate. The heater is thermally connected to the gas channel to heat a gas in the gas channel. The fluid guider is configured to guide the heated gas to the gas channel.

According to an embodiment of the disclosure, the 3D printing apparatus further includes a duct. The heater is configured in the duct, and an end of the duct faces a top of the tank.

According to an embodiment of the disclosure, the fluid guider includes a fan, a compressed gas source, and a pump.

According to an embodiment of the disclosure, the first transparent plate and the second transparent plate are substantially parallel.

According to an embodiment of the disclosure, the 3D printing apparatus further includes two side boards, and the two side boards, the first transparent plate, and the second transparent plate define the gas channel.

According to an embodiment of the disclosure, a 3D printing apparatus including a base plate, a transparent plate, a fluid space, a molding container, a heater, a fluid guider, and a light engine is provided. The fluid space is disposed between the base plate and the transparent plate. The molding container has an accommodating space, and the base plate is disposed in the accommodating space. The heater is configured to heat a fluid. The fluid guider is configured to guide the heated fluid into the fluid space. The light engine is configured to project a pixelated light on the base plate.

According to an embodiment of the disclosure, the light engine includes one of a liquid crystal display, a micro light emitting diode display, or a digital light processing projector.

According to an embodiment of the disclosure, the 3D printing apparatus further includes a release film disposed at a bottom of the molding container, and the base plate directly contacts the release film.

According to an embodiment of the disclosure, a material of the base plate and a material of the transparent plate are the same.

According to an embodiment of the disclosure, the light engine is configured to output a pixelated light. After the pixelated light sequentially passes through the transparent plate, the fluid space, and the base plate, the pixelated light illuminates a photocurable resin in the molding container.

Based on the above, the 3D printing apparatus provided in the disclosure has the fluid space so that the photocurable resin may be uniformly heated and the heating efficiency is increased.

In order to make the aforementioned features and advantages of the disclosure comprehensible, embodiments accompanied with drawings are described in detail below.

DESCRIPTION OF THE EMBODIMENTS

Figure 1:
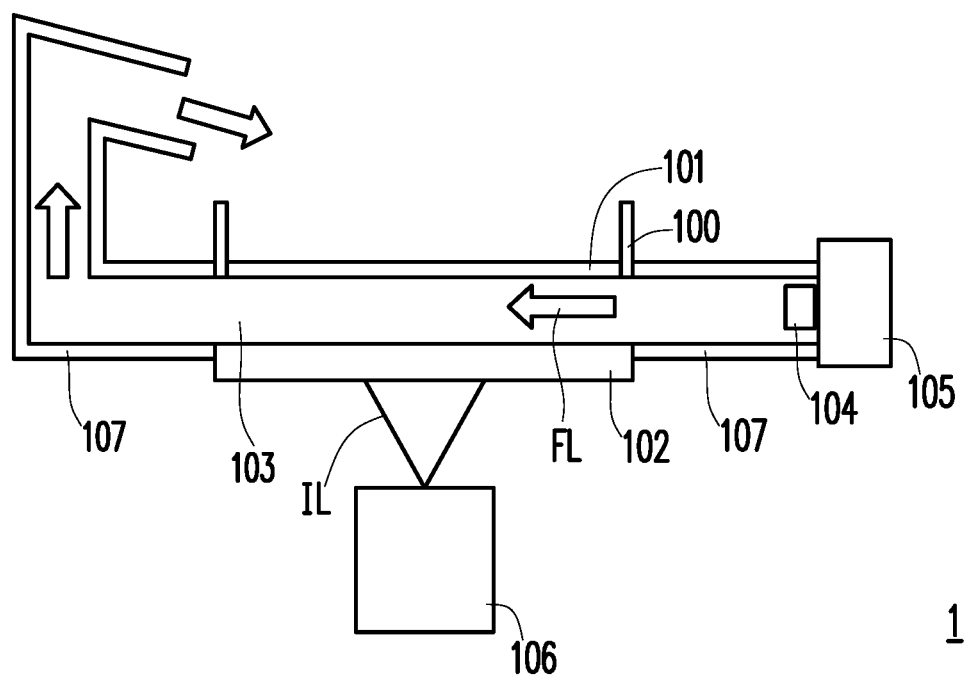
FIG. 1 is a schematic cross-sectional diagram of a 3D printing apparatus according to an embodiment of the disclosure.

Referring to FIG. 1, a 3D printing apparatus 1 includes a tank 100, a first transparent plate 101, a second transparent plate 102, a gas channel 103, a heater 104, a fluid guider 105, and a light engine 106. The gas channel 103 is disposed between the first transparent plate 101 and the second transparent plate 102 to serve as a fluid space, allowing a fluid, such as air flow, to flow. The tank 100 has an accommodating space to accommodate a photocurable resin. The first transparent plate 101 is disposed at a bottom of the tank 100. The first transparent plate 101 may be a release film of the 3D printing apparatus 1. The heater 104 is configured to heat a fluid FL. The fluid guider 105 is configured to guide the heated fluid FL into the gas channel 103. The light engine 106 is configured to output a pixelated light IL. After the pixelated light IL sequentially passes through the second transparent plate 102, the gas channel 103, and the first transparent plate 101, the pixelated light IL illuminates the photocurable resin in the tank 100, and forms, for example, an image on the photocurable resin in the tank 100.

In the embodiment, the first transparent plate 101 is also a transparent plate. The fluid FL is, for example, air. The gas channel 103 is a gas channel allowing air to pass through. However, the disclosure is not limited thereto. In other embodiments, the fluid FL may be other transparent fluid such as a transparent liquid. Since a disturbance of a liquid may affect a pixelated light projection of the light engine 106, air is selected as the fluid FL in the embodiment to avoid the disturbance. In an embodiment, the fluid guider 105 includes a fan, a compressed gas source, and a pump and guides the heated air into the gas channel 103. In an embodiment, a material of the first transparent plate 101 and a material of the second transparent plate 102 are the same. Since the light engine 106 may project an image into the tank 100 through the second transparent plate 102 and the first transparent plate 101, optical aberration may be reduced by adopting the same material of the first transparent plate 101 and the second transparent plate 102. However, considering the intensity, different materials may be adopted, and the disclosure is not limited thereto. The material of the first transparent plate 101 and the material of the second transparent plate 102 may be different.

Figure 2:
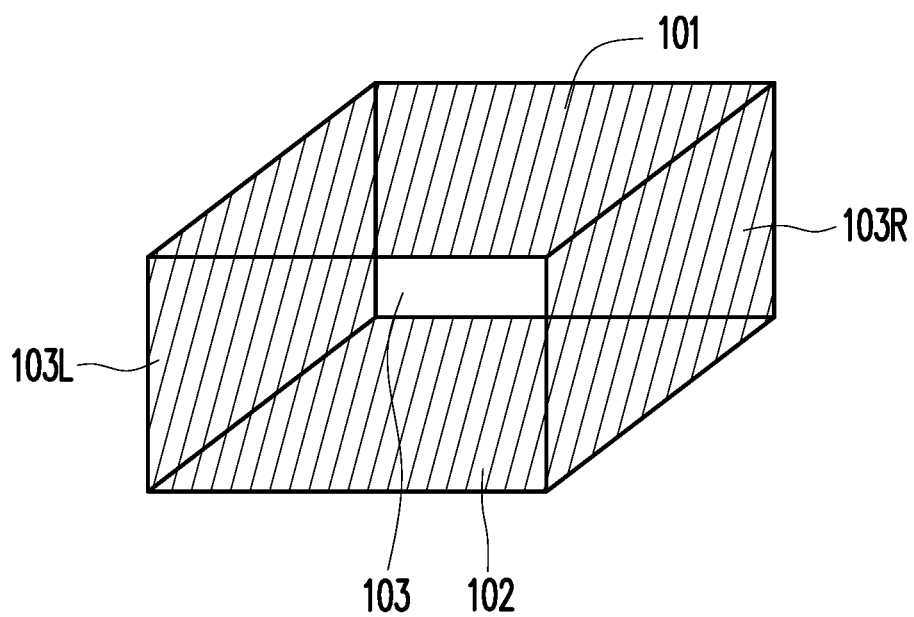
FIG. 2 is a schematic perspective diagram of a fluid space of a 3D printing apparatus according to an embodiment of the disclosure.

In an embodiment shown in FIG. 2, the 3D printing apparatus 1 may further include two side boards 103R and 103L. The two side boards 103R and 103L, the first transparent plate 101, and the second transparent plate 102 define the gas channel 103. In FIG. 2, the first transparent plate 101 and the second transparent plate 102 are substantially parallel, and the two side boards 103R and 103L are disposed perpendicular to the first transparent plate 101 and the second transparent plate 102. However, the disclosure is not limited thereto. In other embodiments, other included angle that is different from a 90-degree angle may be present between adjacent two of the side board 103R, the side board 103L, the first transparent plate 101, and the second transparent plate 102. In the embodiment, the gas channel 103 is in a shape of cube; however, the disclosure is not limited thereto. In other embodiments, the gas channel 103 may be in a shape that is different from a cube such as a cylinder.

In some embodiments of the disclosure, a size and a thickness of the first transparent plate 101 and a size and a thickness of the second transparent plate 102 are the same; however, the disclosure is not limited thereto. In other embodiments, the size and the thickness of the first transparent plate 101 and the size and the thickness of the second transparent plate 102 are different. For example, the first transparent plate 101 may have a greater thickness to support the photocurable resin in the tank 100. Since it is not required for the second transparent plate 102 to provide such support, the second transparent plate 102 may be thinner to reduce a cost and a weight. In addition, since the second transparent plate 102 is closer to the light engine 106 than the first transparent plate 101, an area of the second transparent plate 102 may be smaller as long as the second transparent plate 102 may be passed through by the pixelated light IL. Therefore, the area of the second transparent plate 102 may be smaller to reduce the cost and the weight.

Referring to FIG. 1 again, the 3D printing apparatus 1 may further include a duct 107. The heater 104 is configured in the duct 107 and boosts the heating efficiency. The tank 100 may accommodate the photocurable resin and serve as a molding container of the 3D printing apparatus 1. The light engine 106 projects the pixelated light IL, and after the pixelated light IL transmits the second transparent plate 102, the pixelated light IL transmits the first transparent plate 101 to illuminate the photocurable resin in the tank 100. The light engine 106 may include one of a liquid crystal display, a micro light emitting diode display, or a digital light processing projector.

Figure 3:
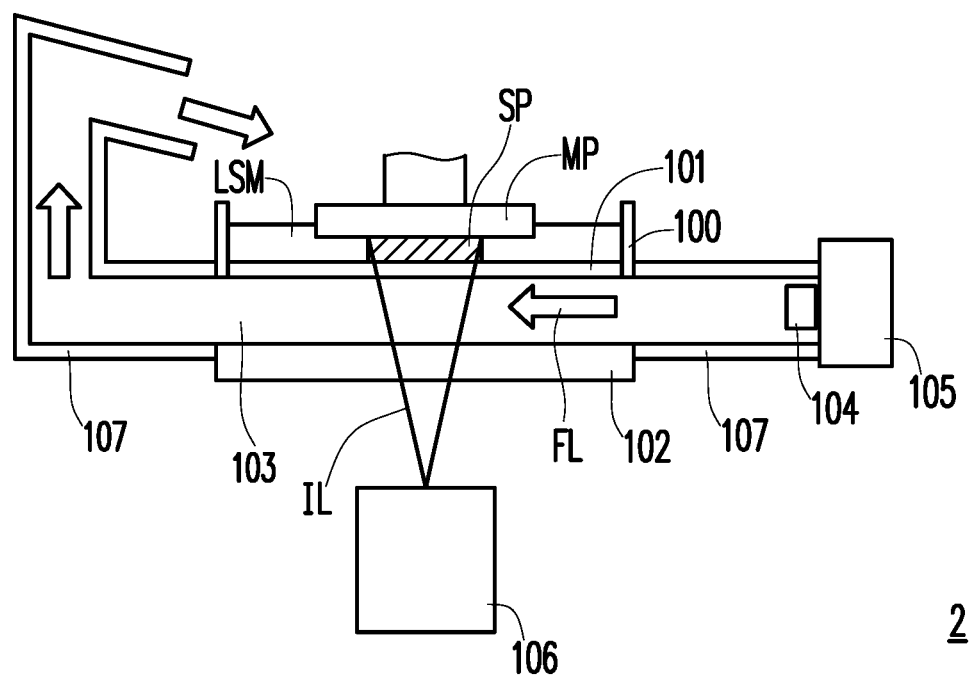
FIG. 3 is a schematic cross-sectional diagram of a 3D printing apparatus according to an embodiment of the disclosure.

Below referring to FIG. 3, FIG. 3 is a schematic cross-sectional diagram of a 3D printing apparatus according to an embodiment of the disclosure. Compared to the embodiment shown in FIG. 1, a 3D printing apparatus 2 further includes a base plate MP. The gas channel 103 is disposed between the base plate MP and the second transparent plate 102. The base plate MP is disposed in the accommodating space of the tank 100. After the pixelated light IL projected by the light engine 106 transmits the second transparent plate 102, the pixelated light IL transmits the first transparent plate 101 and forms, for example, an image on the base plate MP. In an embodiment, a material of the base plate MP and the material of the second transparent plate 102 may be the same. In the embodiment, air serves as the fluid FL to avoid a disturbance of the liquid fluid FL affecting a result of a pixelated light projection of the light engine 106 to the base plate MP.

A photocurable resin LSM is disposed in the tank 100. When additive manufacturing does not start, the base plate MP directly contacts the first transparent plate 101. The photocurable resin LSM is patterned through additive manufacturing due to the illumination of the light engine 106 and a workpiece SP is additively formed. Note that since the heated air is guided into the gas channel 103, the heated air heats the first transparent plate 101 so that the photocurable resin LSM waiting to be cured may be uniformly heated by an upper surface of the first transparent plate 101. A viscosity coefficient of the photocurable resin LSM is reduced, and the photocurable resin LSM on the first transparent plate 101 may be rapidly refilled to reduce release time and a release pulling force.

An end of the duct 107 faces a top of the tank 100 to further heat the photocurable resin LSM and reduce the viscosity of the photocurable resin LSM. Apart from accelerating curing of an additive manufacturing product (the workpiece SP), the release pulling force between a supporting platform of the workpiece SP and the release film (the first transparent plate 101) is reduced. The design above may further reduce a waste of energy.

According to an embodiment of the disclosure, the 3D printing apparatus 1 may further include a temperature sensor and a control unit. The temperature sensor is configured on the tank 100. The control unit controls the heater 104 and the fluid guider 105 according to a temperature value detected by the temperature sensor and controls a surface temperature of the first transparent plate 101 according to different needs to increase a yield rate.

According to an embodiment of the disclosure, another fluid guider may be further configured at the end of the duct 107 facing the top of the tank 100 so that a circulation of the heated air is more smooth and the surface temperature uniformity of the first transparent plate 101 is increased.

In summary of the above, the 3D printing apparatus provided in the disclosure has the fluid space so that the photocurable resin may be uniformly heated. The electrical power consumption required is low, and a heat insulation design is not required. Moreover, the heating efficiency is increased.

What is claimed is:

1. A 3D printing apparatus, comprising:
a tank configured to accommodate a photocurable resin;
a first transparent plate disposed at a bottom of the tank;
a second transparent plate disposed below the first transparent plate;
a gas channel disposed between the first transparent plate and the second transparent plate, wherein the gas channel is disposed outside the tank;
a heater thermally connected to the gas channel and configured to heat a gas in the gas channel;
a fluid guider configured to guide the heated gas to the gas channel; and
a duct, wherein the heater is configured in the duct, and an end of the duct faces a top of the tank,
wherein a material of the first transparent plate and a material of the second transparent plate are the same.

2. The 3D printing apparatus according to claim 1, wherein the fluid guider comprises a fan, a compressed gas source, and a pump.

3. The 3D printing apparatus according to claim 1, wherein the first transparent plate and the second transparent plate are substantially parallel.

4. The 3D printing apparatus according to claim 1, further comprising two side boards, wherein the two side boards, the first transparent plate, and the second transparent plate define the gas channel.

5. The 3D printing apparatus according to claim 1, further comprising a light engine configured to project a pixelated light on the photocurable resin.

6. The 3D printing apparatus according to claim 5, wherein the light engine is disposed below the second transparent plate for projecting the pixelated light, the second transparent plate is disposed in a light path downstream of the light engine, the first transparent plate is disposed in the light path downstream of the second transparent plate, and the photocurable resin in the tank is disposed in the light path downstream of the first transparent plate.

7. The 3D printing apparatus according to claim 5, wherein the light engine comprises one of a liquid crystal display, a micro light emitting diode display, or a digital light processing projector.

8. The 3D printing apparatus according to claim 1, wherein the first transparent plate is a release film.

* * * * *